United States Patent [19]
Mu et al.

[11] Patent Number: 5,452,002
[45] Date of Patent: Sep. 19, 1995

[54] COLOR DATA IMAGE ENCODING METHOD AND APPARATUS WITH SPECTRAL ZONAL FILTER

[76] Inventors: Guo-Guang Mu; Zhi-Liang Fang; Fu-Lai Liu; Ming-Ze Lu, all of 94 Weijin Road, Tianjin 300071, China

[21] Appl. No.: 98,947

[22] Filed: Jul. 27, 1993

[51] Int. Cl.[6] .......................... H04N 9/07; G03B 27/00
[52] U.S. Cl. ..................................... 348/273; 359/563; 359/564; 359/559; 358/331; 358/333
[58] Field of Search .................. 358/331, 333, 334, 41, 358/43, 44; 359/563, 564, 559, 568, 891, 559; 348/266, 272, 273; H04N 9/04, 9/07

[56] References Cited
U.S. PATENT DOCUMENTS

| | | | |
|---|---|---|---|
| Re. 27,491 | 9/1972 | Macovski | 95/12.2 |
| 3,533,340 | 10/1970 | Macovski | 95/12.2 |
| 3,586,434 | 6/1971 | Mueller | 355/2 |
| 3,609,010 | 9/1971 | Mueller | 350/162 SF |
| 3,664,248 | 5/1972 | Mueller | 95/12.2 |
| 4,030,118 | 6/1977 | Dischert | 358/5 |
| 4,623,245 | 11/1986 | Yu | 355/32 |
| 5,053,861 | 10/1991 | Tsai et al. | 358/13 |

OTHER PUBLICATIONS

Galluzzo, Tony, "Canon's RC-570 Still Video System", Shutterbug, Aug. 1992, pp. 142–143.
Physical Optics Notebook: Tutorials in Fourier Optics Reynolds et al.; Published by SPIE; pp. 445–473.

*Primary Examiner*—James J. Groody
*Assistant Examiner*—Cheryl Cohen
*Attorney, Agent, or Firm*—Michael J. Hughes

[57] ABSTRACT

A video color encoding apparatus (10) having a lens (14) for focusing an image (16) on an imaging element (20). The imaging element (20) has a monochromatic CCD imager (22) and a tricolor grating assembly (26) interposed between the CCD imager (22) and the lens (14) such that the image (16) is spatially and spectrally modulated onto the monochromatic CCD imager (22) in data compressed format. The image (16) can be reconstructed using conventional optical techniques with an optical reconstruction apparatus (46) or, alternatively, using mathematical means by a digital computer (42) to be displayed directly on a computer screen (54).

19 Claims, 3 Drawing Sheets

COLOR DATA IMAGE ENCODING METHOD AND APPARATUS WITH SPECTRAL ZONAL FILTER

TECHNICAL FIELD

The present invention relates generally to the field of video image capture, storage and transmission using optical techniques, and more particularly to an improved method and means for encoding a color image such that it can be stored and transmitted in data compacted form. The predominant current usage of the improved color image encoding method and means is for capturing color images in a monochromatic medium in a manner such that the monochromatic data (using much less data storage than an equivalent multicolor formatted data) can be economically and efficiently stored and transmitted.

BACKGROUND ART

The storage and transmission of data representing visual images is presently a subject of much concern. There is a worldwide effort to accomplish communications networks through which data can be quickly and economically communicated to those people that require it. Some of this data is in the form of voice communications, computer readable data, and in other relatively simple configurations. However, to complete the scheme it is thought to be necessary also to include the ability to store and transmit both still and moving visual images. Systems such as a Broadband Integrated Systems Data Network ("BISDN") are, even now, being implemented to accomplish this purpose.

The purpose of these efforts is to remove the restrictions which have been imposed by limited access to data, thus making the knowledge of the world available to the people of the world at all levels, whether it be for commerce, scientific research, or merely for entertainment. Since much of this knowledge is either entirely in visual form or else requires visual accompaniment to be fully understood, the objective could obviously not be fully achieved unless transmission of visual images is included as an aspect of the system. However, it is a significant problem that visual images can include a great deal of information which, when reduced to digitized form, requires a correspondingly large amount of data to be stored and transmitted. In the case of still images, it is a problem that they take up so much digital storage space to archive and a further problem that they require so much time and/or bandwidth to transmit. In the case of moving images, the problem is much greater. Indeed, even with the great bandwidth available with proposed BISDN standards, conventional digitized video images cannot be transmitted rapidly enough to communicate moving images of reasonably high quality. Either the resolution of the image and/or the refresh rate (the rate at which the frames of the image are replaced) must be compromised using conventional prior art methods.

In an effort to solve the problem, a number of means of data compression of video images have tried. One method that is widely used is to delete portions of the data, as by eliminating every other line and/or every other pixel in a line of a scanned image. Relatively simple algorithms are used, as required, to reconstruct a whole image from such a data depleted image. Indeed, for many purposes this is an entirely satisfactory method, and the quality of the picture produced thereby is only marginally inferior to the original. More complex methods also are being tried. One such relatively complex method is to analyze each succeeding frame in a moving video image to determine just which portions of the image are changed as compared to the last. Then, information containing only the changed portion of the image is transmitted. This method can result in an image of very good quality. However, it requires a great deal of computing power, particularly at the sending end of the video data transmission, and only expensive high speed computers can be used in accomplishing this method. As can be appreciated, if it were to take longer to perform the necessary calculations than the normal transmission time of a video frame then the whole purpose of this method would be defeated, and only the relatively expensive computers can perform the necessary calculations with sufficient rapidity.

Yet another disadvantage of all of the above mentioned prior art methods of video data compression is that there is only a comparatively small reduction in the amount of data which must be stored or transmitted. To the inventor's knowledge, no prior art method has achieved an optimal amount of data compression of video images.

To the inventors' knowledge, prior to the present invention an optical solution to the above discussed problem has not been tried. However, the present inventor has realized that there exists in the prior art of photography the grain of an idea that can be applied to the present problem. Since the early days of photography, there has been much effort expended in developing and improving various means for recording images on film that can be developed into a photograph having an accurate reproduction of the colors of the original subject. At the inception of the science of color photography the efforts were divided between the search for a polychromatic film that could be altered in different ways by different light spectra, and the search for a means of encoding a photographic image so that it could be stored on a monochromatic film. With improvements in the chemical processes involved, polychromatic film proved to be the best and most practical solution to the problem for most applications, and today those skilled in the art will recognize that color photography is accomplished almost exclusively using such polychromatic film.

However, there are certain inherent advantages to the alternative approach. Among these are the fact that monochromatic film can be produced with less expense. More importantly, for many purposes, monochromatic film can be stored for extended periods of time without deteriorating, while most common "color" films fade markedly over time. Also, all other things being equal, a shorter exposure time may be used with monochromatic film, thus making it a better choice for photography in low light conditions, or to photograph fast moving subjects. For these reasons, the study of encoding color images using monochromatic media has not entirely died in the field of photography. For example, U.S. Pat. Nos. 3,586,434 and 3,609,010, both issued to Mueller, have each presented inventions relating to the encoding of color images onto a monochromatic medium. Briefly, the general techniques around which the Mueller inventions revolve (and which are common both to the Mueller inventions and to a great many other efforts in the field) involve superimposing three images on a monochromatic film, each of the three being the result of a reflection of light from an object which is spatially and spectrally filtered such that the stored image is modulated according to Fourier transform techniques accomplished by the physical means of the spatial and spectral filters. The image can be reconstructed to its original form generally by a physical process essentially the reverse of the encoding technique. This technology is sometimes referred to as "spectral zonal photography", and spectral zonal photography is a subset of the more general technology of "optically modulated imagery". The more general optically modulated imagery differs from the previously described spectral zonal photography except that the different information modulated onto the film is not restricted to being the three primary colors of a single image. Rather, using optically modulated imagery, a number entirely different objects can be encoded into an image and later separated out using Fourier transform techniques. In a work entitled *Physical Optics Notebook: Tutorials in Fourier Optics* written Reynolds et al. and copublished The International Society for Optical Engineering ("SPIE") and the American Institute of Physics, chapter 34 is entitled "Optically Modulated Imagery" and the known aspects of this science are discussed at length therein.

Although it is suggested in the prior art that it is feasible to use positive color filtering (using red, green and blue filters instead of the generally applied yellow, magenta and cyan filters) to separate the red, green and blue aspects of the visible spectrum and thus to produce a positive image, the utility of the prior art methods has been associated with the advantages of using black and white negative film, and thus the prior art has been concentrated on this aspect of the method. Therefore, to reconstruct an image of the original scene it has been necessary to cause the reconstructed image (decoded from the black and white film) to be projected back onto negative color film and then to develop that film using conventional techniques. Similarly, while it has also been suggested in the prior art teachings that the encoding process could conceivably be accomplished in a single operation, actual practical prior art encoding methods have involved a multi step operation. In any event, to the inventor's knowledge, none of the prior art has suggested using spectral zonal photography, or the like, to encode an image into digital format, nor have any of the prior art methods been reasonable adaptable to this purpose.

To the inventor's knowledge, no prior art means for using the advantages attainable through optically modulated imagery in the context of digitally encoded data has been devised. All prior art methods for digitally compressing video image data have been less effective or otherwise less desirable than an optical modulation method. Furthermore, all prior art optical modulation methods have required optical reconstruction techniques, which makes the prior art method unsuitable for use with commonly available computer equipment.

DISCLOSURE OF INVENTION

Accordingly, it is an object of the present invention to provide an image encoding and decoding method and means which will encode a color visual image using a minimal amount of digital data.

It is another object of the present invention to provide an image encoding and decoding method and means which can encode color visual images in real time, without a significant processing delay intervening between the recordal of the image and electrical transmission thereof.

It is still another object of the present invention to provide an image encoding and decoding method and means which can produce a relatively high quality reproduced image.

It is yet another object of the present invention to provide an image encoding method which can produce images that can be decoded using conventional personal computers.

It is still anther object of the present invention to provide an image encoding and decoding method in which encoding can be done optically (thus requiring little computational effort) and further in which decoding can be done by means of a computer (thus requiring no special equipment to decode).

It is yet another object of the present invention to provide an image encoding and decoding method and means which can enable real time transmission of high quality moving digital video images over conventional limited bandwidth transmission means.

Briefly, the preferred embodiment of the present invention is an optical encoding device which three spatial filters in combination with three spectral filters to modulate an image onto a monochromatic charge coupled device "(CCD)" imager such that the image is captured in digital form similar to (and requiring no more data storage than) an equivalent black and white image. The image may be stored and/or transmitted in this data compacted format. The image may be reconstructed to its original color visual format either by projecting the image through reconstructive optics or, alternatively (and preferably in most applications), the stored image may be manipulated by a computer using Fourier transform techniques to cause a color image to be produced by the computer.

An advantage of the present invention is that a color image may be digitized into a highly data compacted format.

A further advantage of the present invention is that a great many color images may be archived while using relatively little storage capacity.

Yet another advantage of the present invention is that color video image may be transmitted relatively quickly using existing digital transmission means.

Still another advantage of the present invention is that a highly data compressed digitized image can be used to create a relatively high quality reproduction of an original scene.

Yet another advantage of the present invention is that no special equipment is required to reproduce a video image from archived data.

Still another advantage of the present invention is that a great quantity of visual information can be archived and transmitted as need to end users.

Yet another advantage of the present invention is that visual information can be archived for an extended period of time without deterioration.

These and other objects and advantages of the present invention will become clear to those skilled in the art in view of the description of the best presently known mode of carrying out the invention and the industrial applicability of the preferred embodiment as described herein and as illustrated in the several figures of the drawing.

BEST MODE FOR CARRYING OUT INVENTION

The best presently known mode for carrying out the invention is a color image encoding apparatus for optically modulating a color scene into a data compressed digital format. The predominant expected usages of the inventive color image encoding apparatus are for the digitization of visual information where a great quantity of such information is to be archived or where the information must be transmitted using means having limited bandwidth and/or transmission speed, as in the transmission of moving video images over standardized BISDN networks.

Figure 1:
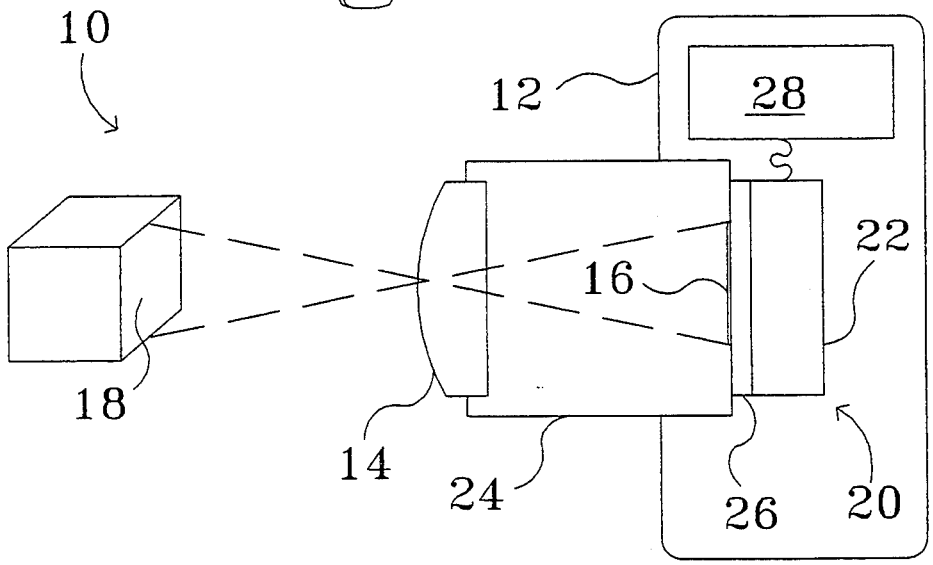
FIG. 1 is a schematic diagram of an optical color image encoding apparatus according to the present invention.

The color encoding apparatus of the presently preferred embodiment of the present invention is illustrated in FIG. 1 and is designated therein by the general reference character 10. The color encoding apparatus 10 is, in many of its substantial components, not unlike conventional video cameras (not shown). A camera body 12 has a lens 14 for projecting an image 16 of a scene 18 (represented in the diagram of FIG. 1 by a simple box) onto an imaging element 20 having therein a charge coupled device ("CCD") imager 22. The lens 14 is held in place on the camera body 12 by a lens housing 24. In the best presently known embodiment 10 of the present invention the imaging element 20 has a tricolor grating 26 which is interposed between the lens 14 and the CCD imager 16 such that the image 16 projected upon the CCD imager 22 is modulated according to the principles of spectral zonal photography.

The 16 image is digitized by the CCD imager 22 under control of a camera electronics 28. The CCD imager 22 and the camera electronics 28 are entirely conventional in nature, and will not be discussed in detail herein. Indeed, it is one of the objects of the present invention that a conventional CCD imager 22 and camera electronics 28 such as are conventionally used for recording images in "black and white" can be used to record a record of the image 16 while retaining information relating to the colors of the image 16. One skilled in the art will recognize that there are several existing formats in which monochromatic visual images may be stored and transmitted. The exact digitizing algorithm used is not relevant to the present invention. Indeed, there exist in the art methods for converting digitized video image from one format to another. Again, it is an object of the present invention that it be compatible with existing equipment such that the data storage and/or transmission means be essentially blind to the fact that information relating to color is contained within what is generally considered to be the black and white video data.

Figure 2:
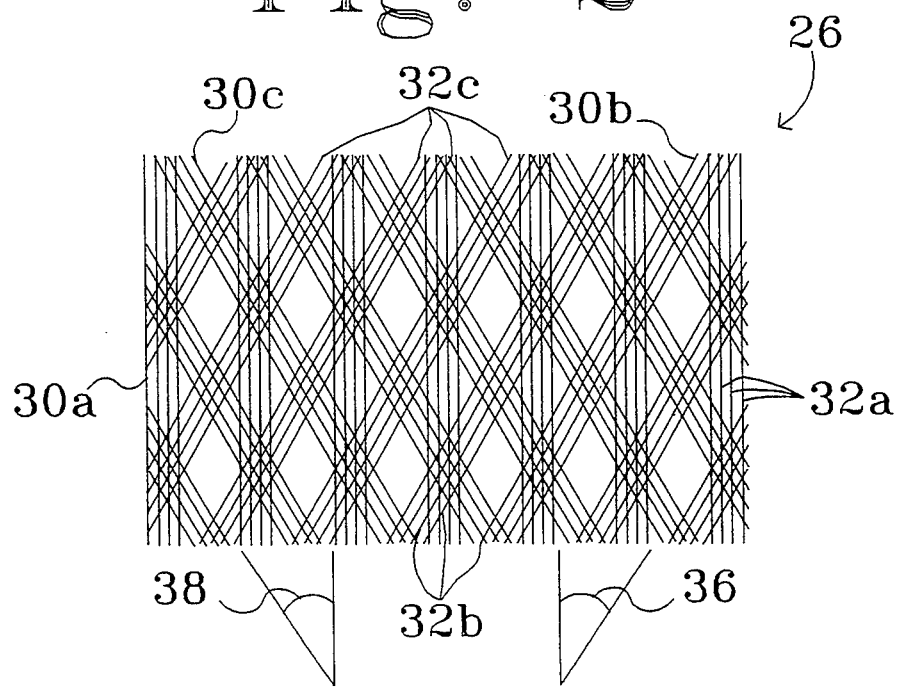
FIG. 2 is a diagrammatic representation of the tricolor grating of FIG. 1.

The tricolor grating 26 of the best presently known embodiment 10 of the present invention is constructed from a color reversal film generally in the manner known in the art of spectral zonal photography which is disclosed in detail in U.S. Pat. No. 3,586,434 issued to Mueller. FIG. 2 is a diagrammatic representation of a front elevational view of the tricolor grating 26. As can be seen in the view of FIG. 2, the tricolor grating 26 has a plurality of gratings 30 with a red grating 30a having a plurality of red grating lines 32a, a green grating 30b having a plurality of green grating lines 32b and a blue grating 30c having a plurality of blue grating lines 32c. Each of the grating lines 32 is disposed generally parallel to its own kind (red 32a, green 32b or blue 32c) within their respective gratings (red 30a, green 30b and blue 30c). The green grating lines 32c are arrayed at a first offset angle 36 which is +40° relative to the red grating lines 32a while the blue grating lines 32c are disposed at a second offset angle 38 which is −40° relative to the red grating lines 32a.

Figure 3:
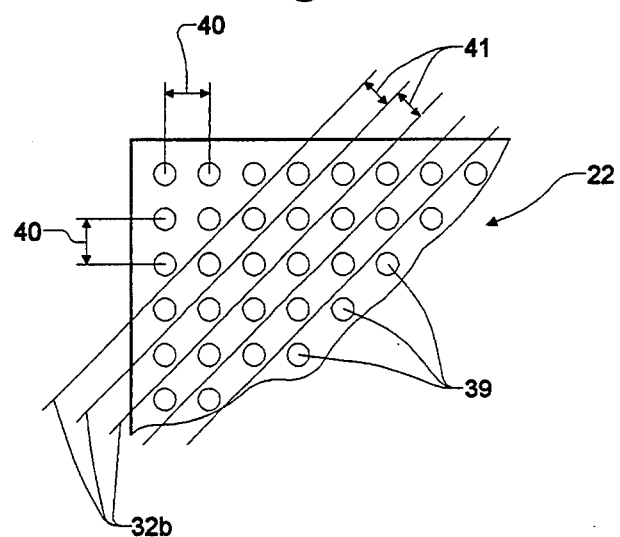
FIG. 3 is a diagrammatic representation of the CCD imager of FIG. 1.

FIG. 3 is a diagrammatic representation of a portion of a front elevational view of the CCD imager 22. A primary concern in the construction of the present inventive color encoding apparatus 10, and one which has it has not been necessary to address in any related prior art, is that the CCD imager 22 is a discrete medium which has a plurality of discrete pixel locations 39 wherein the image 16 (FIG. 1) is received. A pixel spacing indicator arrow 40 designates the center-to-center spacing of the pixel locations 39 in FIG. 1. In the view of FIG. 3, a plurality of the grating lines 32 are shown superimposed over the CCD imager 22. An grating line spacing indicator arrow 41 designates the center-to-center spacing (sometimes referred to in the art as the "constant" or the "period") of the grating lines 32. For the sake of clarity, the grating lines 32 of FIG. 3 are shown oriented as are the green grating lines 32b of FIG. 2. The red grating lines 32a and the blue grating lines 32c are omitted from the view of FIG. 3 for the sake of clarity. According to the best presently known embodiment 10 of the present invention, spacings between the red grating lines 32a and the blue grating lines 32c are like that described here in relation to FIG. 3 for the green grating lines 32b. In accordance with the present invention the pixel spacing 40 should be equal to or less than the grating line spacing 41.

Although the tricolor grating 26 could, theoretically, be positioned away from the CCD imager 22, in the best presently known embodiment 10 of the present invention, the tricolor grating 26 is placed in contact with the CCD imager 22 in the imaging element 20 such that the alignment between the tricolor grating 26 and the CCD imager 22 can be precisely maintained.

Figure 4:
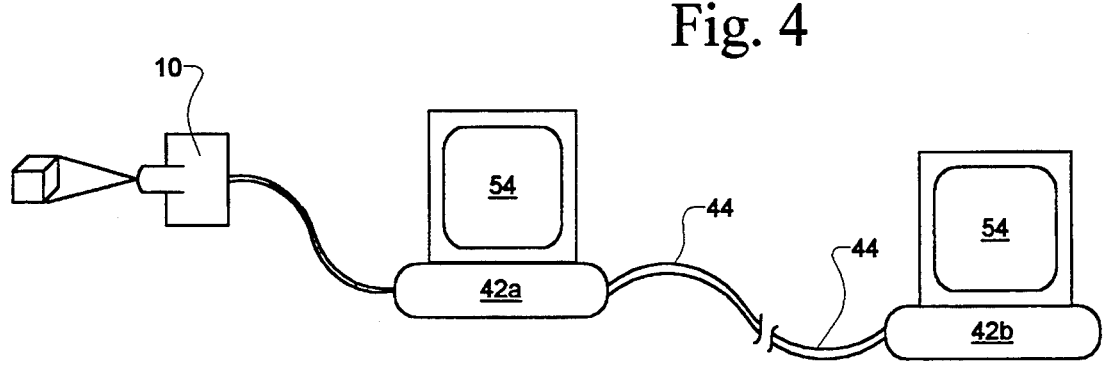
FIG. 4 is a video system including the optical color image encoding apparatus of FIG. 1.

FIG. 4 is a diagrammatic representation of the color encoding apparatus 10 connected to a local computer 42a and a remote computer 42b. In accordance with the present inventive method, the image 16 (FIG. 1) can be transmitted to and stored at the local computer 42a and/or it can be transmitted to the remote computer 42b via a data transmission means 44. As previously discussed herein, the data transmission means 44 can be any means of transmitting data between the computers 42 which is appropriate to the particular format into which the image 6 is digitized. One skilled in the art will also recognize that the computers 42 of the best presently known embodiment 10 of the present invention are but one of several known means for storing and displaying video information. Indeed, the CCD imager 22 and associated camera electronics 28 could readily be adapted to convert the image 16 into broadcast television transmission (PAL or NTSC, for example) format, and the computers 42 could have a video recorder and/or television receiver operating in association with or substituted therefore. Therefore, the computers 42 of the best presently known embodiment 10 of the present invention are intended to be representative of the more general term "video data storage and display devices".

Figure 5:
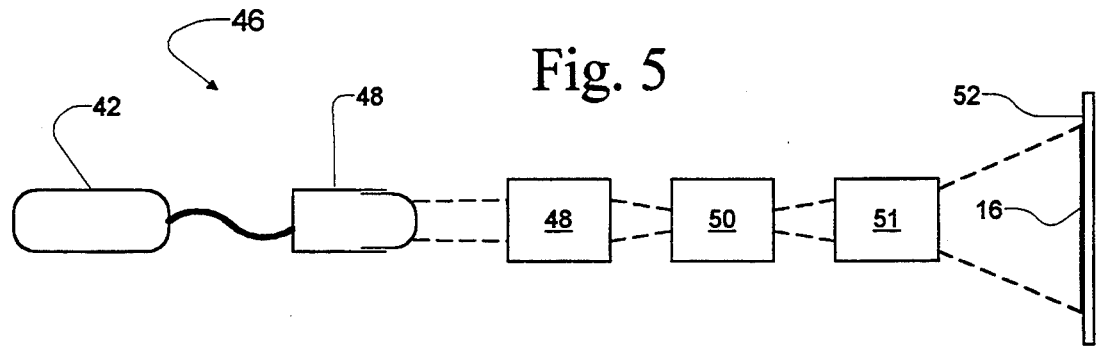
FIG. 5 is an optical image reconstruction means according to the present inventive method.

FIG. 5 depicts an optical reconstruction apparatus The image 16 stored in the computer 42 is projected by a video projector 48 (the video projector 48 may be a simple video monitor, television, or the like, upon which the image 16 is displayed) successively through a first white light Fourier transform lens 49, a frequency spectrum color filter 50, and a second white light Fourier transform lens 51, and then onto a projection screen 52 located at the image plane of the Fourier transform lens 50. This process does not differ substantially from prior art methods for reconstructing an image using spectral zonal photography techniques, except that the image 16 emanates from the computer 42 and the video projector 48 rather than from film and an optical projector (not shown). Therefore, the example of FIG. 5 represents an adaption of the present inventive method to the prior art optical projection techniques using the Fourier transform lens 50. It should be noted that the Fourier transform lens 50 is constructed as previously described herein in relation to the tricolor grating assembly 26 (FIG. 2) and is differentiated therefrom herein by application rather than construction.

Figure 6:
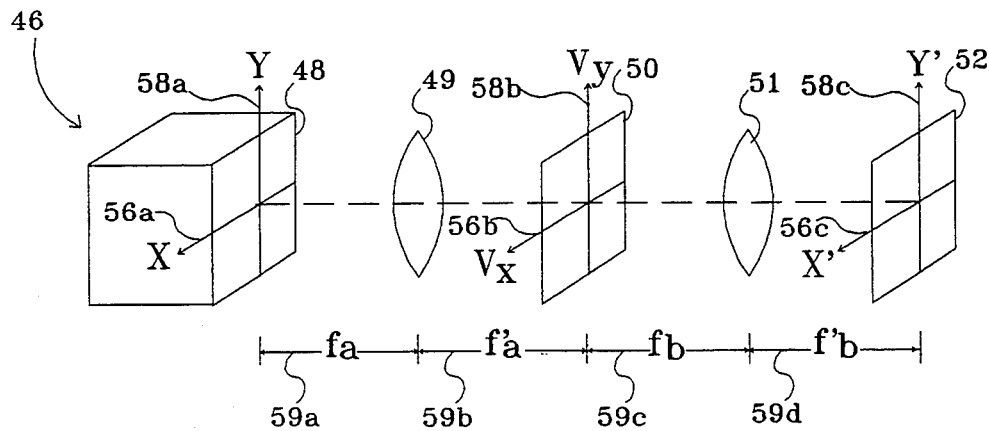
FIG. 6 is a diagrammatic representation of the optical image reconstruction means of FIG. 5.
Figure 7:
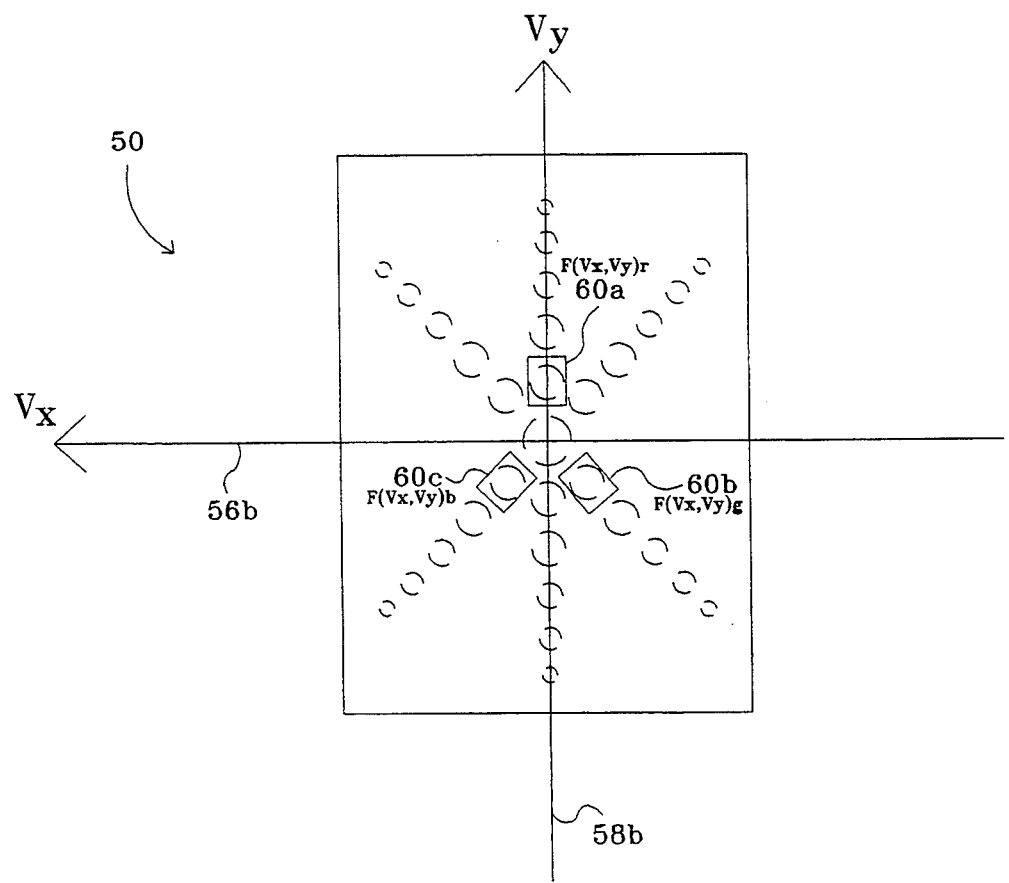
FIG. 7 is a planar view of the Fourier transform lens of FIG. 6.

As an alternative to the method of reconstituting the image 16 discussed above in relation to FIG. 5, the necessary Fourier transforms may be performed mathematically by the computer 42 and displayed directly on a computer screen 54 (FIG. 4). FIG. 6 is a diagrammatic representation of the optical reconstruction apparatus 46 depicted in FIG. 5. In the view of FIG. 6, an X axis 56 and a Y axis 58 are drawn at the position of the image 16 seen at the output plane of the video projector 48, the color filter 50 and the position of the projection screen 54 (designated herein as 16' to distinguish the unresolved image 16' from the final image 16 (FIG. 5) which occurs at the projection screen The axes of the image 16 are designated X 56a and Y 58a, the axes of the color filter 50 are designated $V_x$ 56b and $V_y$ 58b and the axes of the projection screen are designated X' 56c and Y' 58c. Transitions from the image 16 location to the first Fourier transform lens 49 ("fa"), from the first Fourier transform lens 49 to the color filter 50m ("f'a"), from the color filter 50 to the second Fourier transform lens 51 ("fb") and from the color filter 50 to the projection screen 52 ("f'b") are designated by the enumerations 59a, 59b, 59c and 59d, respectively. FIG. 7 is a planar view of the color filter 50 showing the axes 56b and 58b thereof in relation to exemplary color locations red ("r") 60a, green ("g") 60b and blue ("b") 60c. One skilled in the art should be able to readily derive the reconstruction expression which should be applied by the computer 44 to mathematically perform the equivalent of the optical reconstruction apparatus 46. However, for the sake of completeness, the expression is will be provided here. Where f(x,y) is the encoded image 16 the, correspondingly through the first Fourier transform lens 49 the expression is:

$$F(V_x, V_y) = \int_{-\infty}^{\infty} \int f(x,y) e^{-i2\pi(V_x X + V_y Y)} dx dy$$

where $F(V_x, V_y)$ is the Fourier Transform of the image function (f (x,y) and, as previously discussed, $V_x$, $V_y$ are the coordinate axes of the frequency space. By color filtering in the frequency space (FIG. 7) and through the second Fourier transform lens 51, the expression is:

$$f'(x',y',r,g,b) = \int_{-\infty}^{\infty} \int F(V_x, V_y)_{r,g,b}^2 e^{(V_x X + V_y Y)} dv_x dv_y$$

where f'(x',y',r,g,b) is the resolved color image 16 of the scene 18 (FIG. 1). $F(V_x, V_y)$r, $F(V_x, V_y)$g and $F(V_x, V_y)$b are the first order of spectrum color filtered by the primary color filter portions 30a, 30b and 30c (FIG. 2), respectively, of the color filter 51.

As is shown above, in great part, the color encoding apparatus 10 according to the present invention closely resembles prior art conventional video cameras. Among the substantial differences are the inclusion of the tricolor grating 26 to encode color information regarding the scene 18 onto the monochromatic CCD imager 22. No significant changes of materials are envisioned nor are any special constructions required.

Various modifications may be made to the invention without altering its value or scope. For example, a conventional video camera could be modified to include the tricolor grating assembly 26 as a means of accomplishing the present inventive method.

All of the above are only some of the examples of available embodiments of the present invention. Those skilled in the art will readily observe that numerous other modifications and alterations may be made without departing from the spirit and scope of the invention. Accordingly, the above disclosure is not intended as limiting and the appended claims are to be interpreted as encompassing the entire scope of the invention.

INDUSTRIAL APPLICABILITY

The color encoding apparatus 10 of the present invention may be utilized in essentially any application wherein it is desired to capture visual information having a color content in a data compressed format. Such applications include those wherein a great quantity of video images are to be archived and those wherein video images are to be transmitted. A predominant expected usage is for the recordal of video information such that it can be readily transmitted over BISDN computer networks and the like.

As can be appreciated from the foregoing disclosure, by the inventive method and means essentially 5 dimensional data (X and Y coordinates and the Red, Green and Blue aspect of each coordinate) can be condensed to generally two dimensional data (X and Y) with a single value associated with each coordinate. In this manner the visual information can be compressed to a degree unattainable by all but the most severe strictly mathematical methods. Alternatively, while there is certainly some degradation in picture quality associated with the data compression of the present invention, the inventor has found that the picture quality attainable by the present inventive method is generally superior to that attainable by prior art methods which can even approximate the high degree of data compression attainable by the present method.

It is anticipated that the increasing demand for access to all manner of data, and in light of the fact that much of the visually ascertainable information has yet to be put into digitized form such that it can be accessed by computer users, there will be a substantial demand for the efficient means of simultaneously performing data compression while digitizing images that is presented by the present invention.

The present inventive color encoding apparatus 10 is adaptable for use with existing computers and video equipment, and the inventive method should prove to be adaptable for application to more sophisticated systems yet to be devised. For these and other reasons, it is expected that the utility and industrial applicability of the invention will be both significant in scope and long-lasting in duration.

We claim:

1. A method for storing an image of a scene in steps comprising:
projecting the image of the scene through a spectral zonal filter onto a monochromatic charge coupled device imager; and
encoding the image projected onto said charge coupled device imager into digital format;
storing the encoded image in digital format in a digital computer; and
manipulating the encoded image mathematically with the computer such that reconstructed image can be displayed on a computer screen including color information of the image.

2. The method of claim 1, wherein:
the image is reconstructed by projecting the encoded image using a video projector through a Fourier transform lens.

3. A method for encoding a visual image, comprising:
projecting the image through a tricolor filter, said tricolor filter having a red grating, a green grating and a blue grating with the green grating having a rotated orientation in relation to the red grating and the blue grating having a rotated orientation both in relation to the red grating and to the green grating such that the image is optically encoded within said tricolor filter according to a Fourier transform; and
projecting the transformed image onto a video camera such that the transformed image is converted to electronically encoded form.

4. The method of claim 3, and further including:
delivering the electronically encoded image to a transmission means for transmission to a remote location.

5. The method of claim 3, and further including:
delivering the electronically encoded image to a computer for storage and manipulation of the electronically encoded image by the computer.

6. The method of claim 5, wherein:
the electronically encoded image is converted to transformed visual form by causing the computer to display the image; and
the transformed visual image is projected through an optical reconstruction apparatus for performing an optical Fourier transform on the image to convert the image to its original visually perceptible form.

7. The method of claim 6, wherein:
the optical reconstruction apparatus includes at least one white light Fourier transform lens and a color filter.

8. The method of claim 6, wherein:
the optical reconstruction apparatus has a first Fourier transform lens, a color filter, and a second Fourier transform lens arranged such that the transformed image is projected sequentially through the first Fourier transform lens, then through the color filter, and then through the second Fourier transform lens; and
the image is then projected onto a viewing screen.

9. The method of claim 5, wherein:
the computer mathematically accomplishes a Fourier transform on the electronically encoded image such that the image is converted into its original form within the computer.

10. The method of claim 9, and further including:
displaying the image from the computer onto a computer monitor screen.

11. The method of claim 9, and further including:
transmitting the image from the computer to a remote location.

12. An image encoding apparatus for encoding a visually perceptible image, comprising:
a housing;
a Fourier transform tricolor grating assembly;
a charge coupled device imager; and
a lens attached to the housing such that the image is projected by the lens through the Fourier transform tricolor grating assembly onto the charge coupled device imager.

13. The image encoding apparatus of claim 12, wherein:
said tricolor grating assembly is generally in contact with said charge coupled device imager.

14. The apparatus of claim 12, wherein:
said tricolor grating assembly includes;
a red grating having thereon a plurality of red grating lines arrayed generally parallel to each other;
a green grating having thereon a plurality of green grating lines arrayed generally parallel to each other and further arrayed at a first displacement angle relative to the red grating lines; and
a blue grating having thereon a plurality of blue grating lines arrayed generally parallel to each other and further arrayed at a second displacement angle relative to the red grating lines.

15. The image encoding apparatus of claim 14, wherein:
the first displacement angle is approximately forty degrees in an arbitrarily denominated positive direction of rotation; and
the second displacement angle is approximately forty degrees in a negative direction as compared to the first displacement angle.

16. The apparatus of claim 12, wherein:
said charge coupled device electronically encodes the image and provides the electronically encoded image to a computer.

17. The apparatus of claim 16, wherein:
said computer causes the image to be projected through an optical Fourier reconstruction apparatus such that the image is optically reconstructed.

18. The apparatus of claim 16, wherein:
said computer transforms the encoded image by manipulation of data within the computer such that the image is directly visually perceptible generally in its original form as reproduced by said computer.

19. The method of claim 1, wherein:
the image is reconstructed by accomplishing a Fourier transform with the computer such that displaying the image on the computer screen results in a recognizable reproduction of original image data.

* * * * *